United States Patent
Chen

(10) Patent No.: US 8,866,929 B2
(45) Date of Patent: Oct. 21, 2014

(54) METHOD OF PRODUCING A STILL IMAGE

(71) Applicant: Ability Enterprise Co., Ltd., Taipei (TW)

(72) Inventor: Chi-De Chen, Taipei (TW)

(73) Assignee: Ability Enterprise Co., Ltd., Taipei (TW)

(*) Notice: Subject to any disclaimer, the term of this patent is extended or adjusted under 35 U.S.C. 154(b) by 0 days.

(21) Appl. No.: 13/936,772

(22) Filed: Jul. 8, 2013

(65) Prior Publication Data

US 2013/0293758 A1 Nov. 7, 2013

Related U.S. Application Data

(63) Continuation-in-part of application No. 12/903,106, filed on Oct. 12, 2010.

(51) Int. Cl.
| | | |
|---|---|---|
| *H04N 5/235* | (2006.01) | |
| *G03B 15/08* | (2006.01) | |
| *H04N 5/262* | (2006.01) | |
| *G03B 17/54* | (2006.01) | |
| *H04N 5/225* | (2006.01) | |
| *H04N 5/232* | (2006.01) | |

(52) U.S. Cl.
CPC ............ *H04N 5/23293* (2013.01); *G03B 15/08* (2013.01); *H04N 5/2259* (2013.01); *G03B 2205/0092* (2013.01); *H04N 5/23222* (2013.01); *H04N 5/2621* (2013.01); *G03B 17/54* (2013.01)
USPC ................. 348/229.1; 348/222.1; 348/333.03

(58) Field of Classification Search
None
See application file for complete search history.

(56) References Cited

U.S. PATENT DOCUMENTS

| | | | | |
|---|---|---|---|---|
| 2002/0001036 A1* | 1/2002 | Kinjo | ............................. | 348/231 |
| 2003/0169350 A1* | 9/2003 | Wiezel et al. | .................. | 348/239 |
| 2005/0219384 A1* | 10/2005 | Herberger et al. | ............ | 348/239 |
| 2006/0033823 A1* | 2/2006 | Okamura | ....................... | 348/254 |
| 2010/0225773 A1* | 9/2010 | Lee | ............................. | 348/222.1 |

FOREIGN PATENT DOCUMENTS

| | | |
|---|---|---|
| CN | 1685710 A | 10/2005 |
| TW | 201030678 A | 8/2010 |

OTHER PUBLICATIONS

Willis, K. "Light Tracer, Project Summary." 2005. http://lighttracer.darcy.co.nz/.*
Doble, R. "Camera Painting." Pixiq. 2010. Excerpted from "Experimental Digital Photography." http://www.pixiq.com/article/camera-painting.*
Willis, K. "User Authorship and Creativity within Interactivity." Proceedings of the 14th Annual ACM International Conference on Multimedia, ACM (2006), 731-735.*
Rosenbaum, E. "Glowdoodle: A Medium for Expressive Inquiry." Proceedings of the 7th ACM Conference on Creativity and Cognition, ACM (2009), 469-470.*
"Light Stencil Tutorial" by username tdub303, Posted Jun. 14, 2008, http://www.flickr.com/groups/lightjunkies/discuss/72157605605898202. Accessed Jul. 13, 2014.*
"Noctography—Tutorial 4: Light Stencils" by username Noctography, Internet video posted May 25, 2011, http://www.youtube.com/watch?v=k9A9H41u9wk. Accessed Jul. 13, 2014.*

* cited by examiner

*Primary Examiner* — Twyler Haskins
*Assistant Examiner* — Dwight C Tejano
(74) *Attorney, Agent, or Firm* — Rabin & Berdo, P.C.

(57) ABSTRACT

A method of producing an image is disclosed. A reference track is received. The reference track is, optionally, displayed on a preview image with at least one light spot. Subsequently, a position of an incident light projected on an image sensor of an image capturing device is varied during an exposure period to trace the reference track. Accordingly, the image with a light track that traces the reference track is captured.

20 Claims, 10 Drawing Sheets

METHOD OF PRODUCING A STILL IMAGE

This application is a continuation-in-part application of application Ser. No. 12/903,106, filed Oct. 12, 2010, the contents of which are incorporated herein by reference.

FIELD OF THE INVENTION

The present invention generally relates to an imaging method, and more particularly to a method of producing an image with a light track.

DESCRIPTION OF RELATED ART

In addition to capturing an image, cameras may be further utilized to create an artistic work by exploiting a variety of functions equipped in modern cameras. Light doodle (or light script) is one such artistic work created by moving the camera during exposure period such that a light spot may become a light track superimposed on a dark background image.

However, not every user can create a favorable light doodle for the reason either that the user is not skillful at mastering the camera or the user's camera is too limited in functions to allow the user to perform light scribing.

For the foregoing reasons, a need has arisen to propose a novel method to either assist the user in creating a favorable light doodle or even automatically create the light doodle according to what the user wants.

SUMMARY OF THE INVENTION

In view of the foregoing, it is an object of the embodiment of the present invention to provide a method of producing a still image with a light track that traces a reference track. The method may assist the user in producing such image, or may automatically produce the image for the user.

According to one embodiment, a reference track is received. The reference track is then displayed on a preview image capture, the preview image having a light spot. Subsequently, a position of an incident light projected on an image sensor during an exposure period is varied to trace the reference track, therefore capturing a still image.

According to another embodiment, a storage medium for storing data for accessing by an application program being executed on a data processing device to perform a method of producing a still image. The method comprises the following steps. A reference track is received, and the reference track is displayed on a preview image captured, the preview image having a light spot. Subsequently, a position of an incident light projected on an image sensor during an exposure period is varied according to the reference track to trace the reference track to capture a still image.

According to a further embodiment, a device for producing a still image comprises a receiver, a display unit, and a mechanism. The receiver receives a reference. The display unit displays the reference track on a preview image capture, the preview image having a light spot. The mechanism varies a position of an incident light projected on an image sensor to trace the reference track during an exposure period to capture the still image.

DETAILED DESCRIPTION OF THE INVENTION

Figure 1:
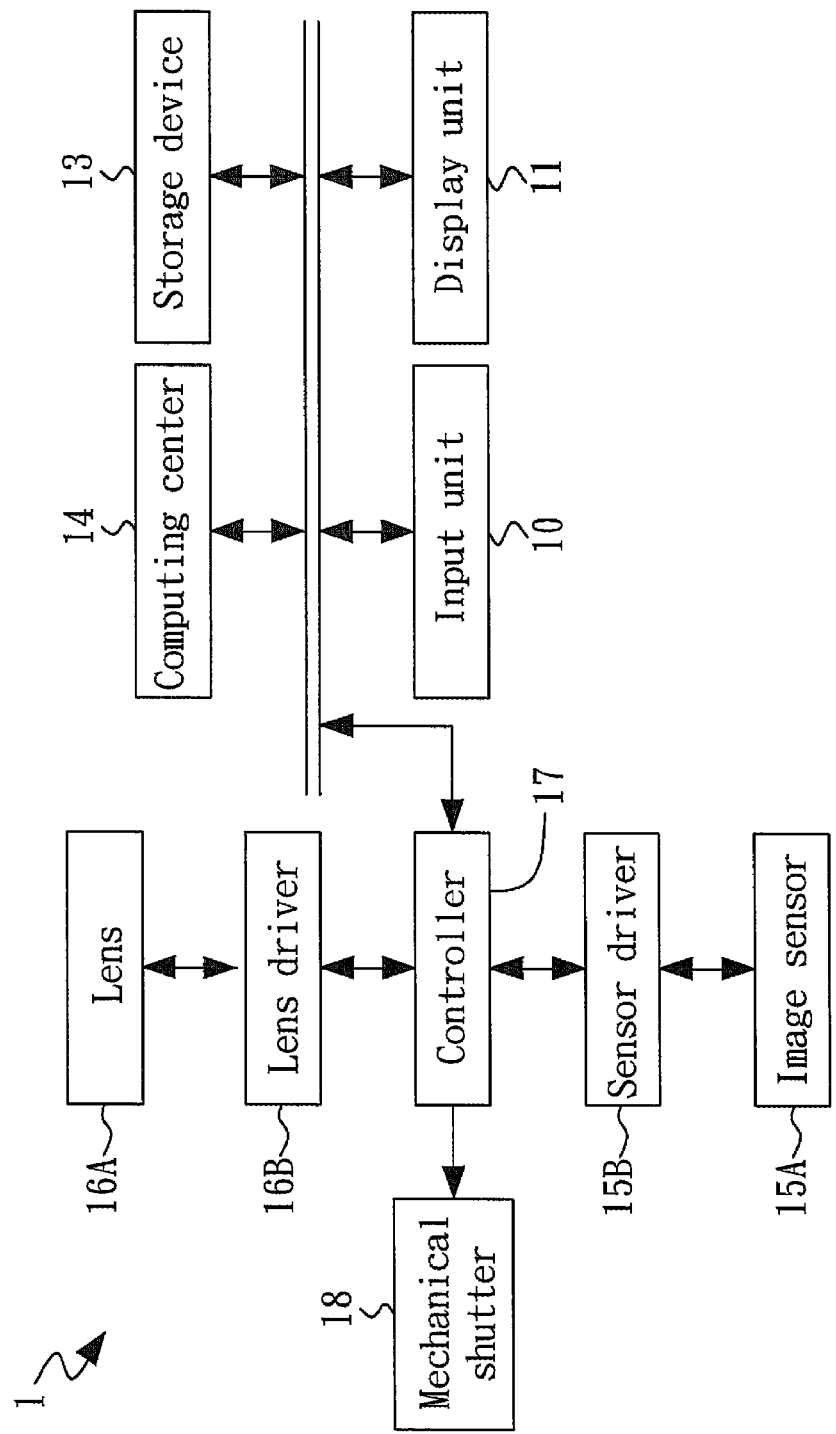
FIG. 1 shows a block diagram of an image capturing device for producing a still image adaptable to the present invention.

FIG. 1 shows a block diagram of an image capturing device 1 for producing a still image adaptable to the present invention. The image capturing device 1 is used in an embodiment of the present invention to produce a still image with a light track that traces a reference track. The image capturing device 1 includes a receiver, a display unit, and a mechanism. The receiver is for receiving the reference track. The display unit is for displaying the reference track on a preview image captured, and the preview image has at least one light spot. The mechanism is for varying a position of an incident light projected on an image sensor to trace the reference track during an exposure period to capture the still image. The image capturing device 1 may be embedded in an electronic device such as a camera, a mobile phone, a video camcorder, an MP3 player, a personal digital assistant (PDA) or a webcam.

Referring to FIG. 1, the image capturing device 1 primarily includes an input unit 10, a display unit 11, a storage device 13, and a computing center 14. In an embodiment, the receiver is such as the input unit 10 as shown in FIG. 1. Specifically, the input unit 10 may be used in the embodiment to input the reference track. The input unit 10 may generally be a human input device (HID) such as a touch panel, a graphics tablet, a pointing device or a keyboard. The display unit 11 may be used in the embodiment to display the image and the reference track. The display unit 11 may be, but not limited to, a liquid crystal display (LCD) or an organic light emitting diode (OLED) display. The input unit 10 and the display unit 11 may be integrally coupled, for example, to form a touch screen. The storage device 13 may be used to store the reference track that is inputted from the input unit 10 or pre-store the reference track beforehand. The storage device 13 may be built-in the image capturing device 1, such as a hard disk drive or a memory device, or a removable storage, such as a memory card, a secure digital (SD) card, or a multimedia card (MMC). The computing center 14 may be used to subject the reference track to signal processing and can be a central processing unit (CPU) or digital signal processor (DSP).

Referring to FIG. 1, the image capturing device 1 further includes a controller 17, an image sensor 15A, a sensor driver 15B, a lens 16A, a lens driver 16B, a shutter 18, and an adjuster (not shown). In an embodiment, the mechanism includes such as the controller 17, the image sensor 15A, the sensor driver 15B, the lens 16A, the lens driver 16B, and the shutter 18. The adjuster is for adjusting brightness values of pixels of the still image according to a length of the exposure period. Specifically, the shutter 18 may be opened or shut down under control of the controller 17 to make sure the quantity of an incident light coming from an object, and the shutter 18 may be a mechanical shutter or an electric shutter. The controller 17 may be used to control the lens driver 16B to drive the lens 16A to make the object image to be in-focus such that a clear image may be projected on the image sensor 15A. The controller 17 may be used to control the sensor driver 15B to drive the image sensor 15A to receive the incident light coming from the object, and the image sensor 15A may be a charge-coupled device (CCD) or a complementary metal-oxide-semiconductor (CMOS) image sensor.

Figure 2:
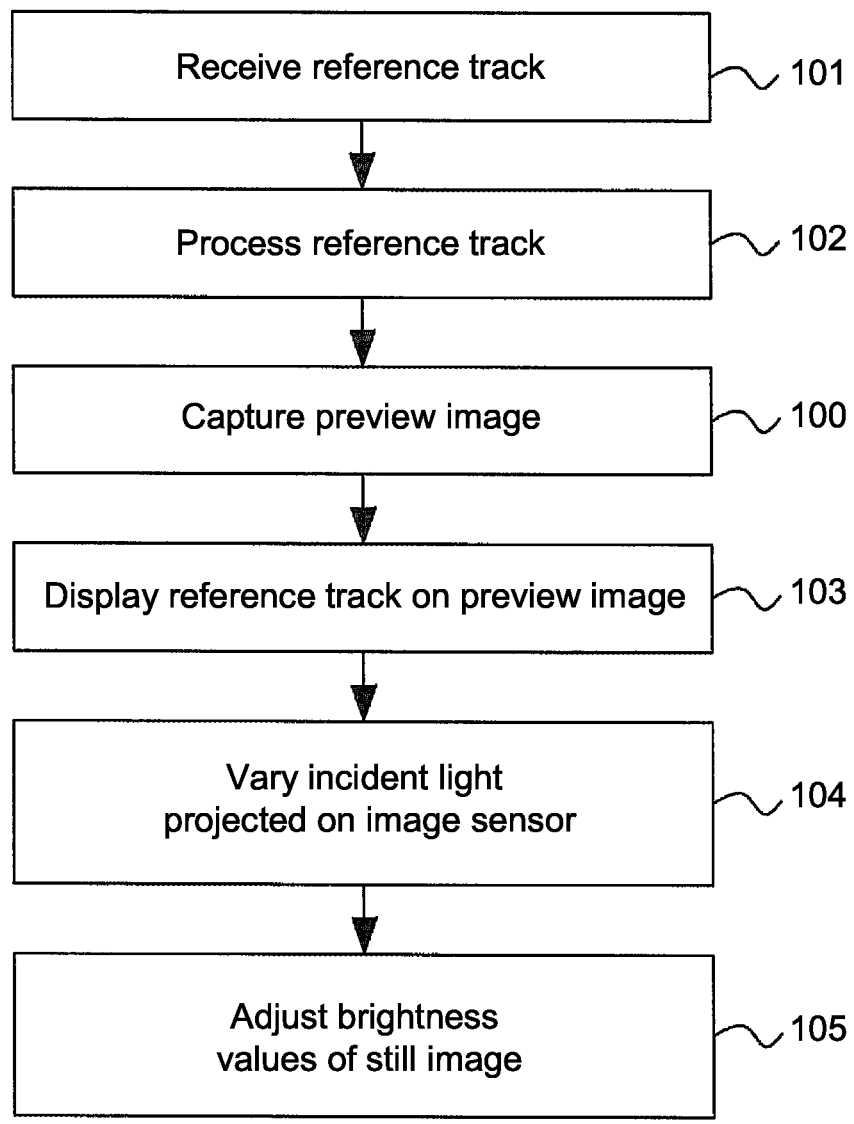
FIG. 2 shows a flow diagram illustrating a method of producing a still image according to a first embodiment of the present invention.
Figure 3A:
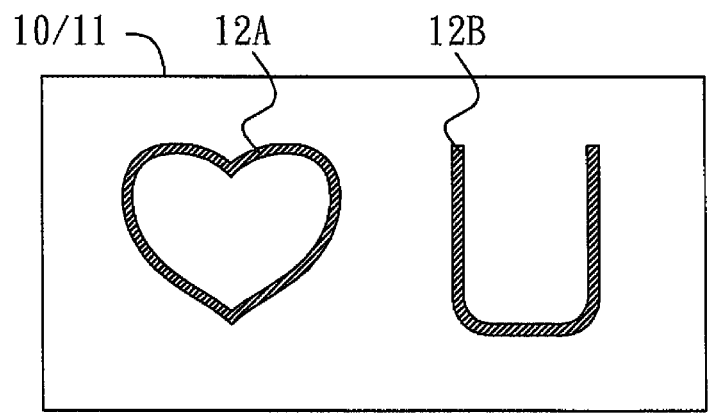
FIG. 3A shows a first reference track and a second reference track.

FIG. 2 shows a flow diagram illustrating a method of producing a still image according to a first embodiment of the present invention. The image capturing device 1 as shown in FIG. 1 is adaptable to the flow diagram of FIG. 2. Specifically speaking, in step 101, the image capturing device 1 receives the reference track which is inputted from the input unit 10 or downloaded from the storage device 13, and the reference track may then be displayed on the display unit 11. Taking FIG. 3A as an example, FIG. 3A shows a first reference track 12A and a second reference track 12B that are inputted by the input unit 10 and are displayed on the display unit 11. As described above, the input unit 10 and the display unit 11 are integrally coupled to form the touch screen, and the reference track may be pre-stored in the storage device 13.

Figure 3B:
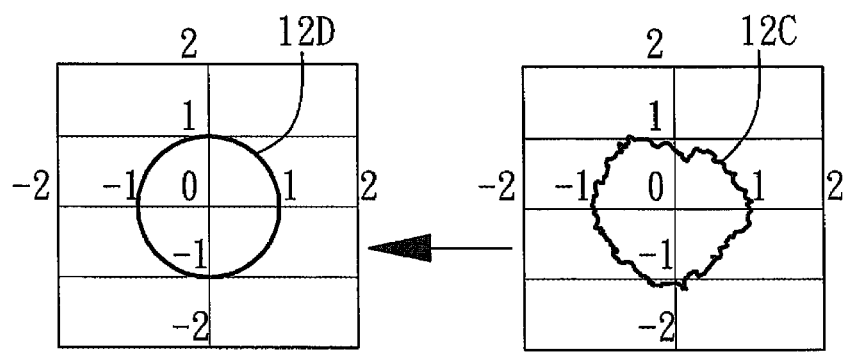
FIG. 3B shows an exemplary reference track and a processed reference track.

Referring to FIG. 2, in step 102, the reference track may be optionally processed by subjecting the reference track to the signal processing by the computing center 14 for filtering rugged line-segments of the reference track which is inputted from the input unit 10. For example, the computing center 14 performs low pass filtering or band pass filtering on the reference track. The low pass filtering and the band pass filtering may be implemented by finite impulse response (FIR) or infinite impulse response (IIR). FIG. 3B shows a raw reference track 12C and a processed reference track 12D. Specifically, the raw reference track 12C is a rugged circle centered at (0,0) with a radius of about 1. After subjecting the raw reference track 12C to the low pass filtering or the band pass filtering by the computing center 14, the processed reference track 12D with a smoothened circumference centered at (0,0) is provided.

Referring to FIG. 2, in step 100, a preview image is captured and displayed on the display unit 11. The preview image has a light spot, which includes at least one pixel with a brightness value greater than brightness values of other non-light spot portion of the preview image.

Still referring to FIG. 2, in step 103, the reference track is displayed or superimposed on the preview image displayed on the display unit 11 that may be performed by on-screen display (OSD) technique.

Referring to FIG. 2 and FIG. 1, in step 104, a position of the incident light projected on the image sensor 15A is varied to trace the reference track during an exposure period. In the embodiment, after a shutter button is pressed to enter the exposure mode, the shutter 18 is opened and a user may move the image capturing device 1 in reference to the reference track shown on the display unit 11 such that the position of the light spot projected on the image sensor 15A is varied to trace the reference track. That is, the user may move the image capturing device 1 according to the light spot and the reference track in order to capture a still image with a light track that traces the reference track.

In the embodiment, the user may move the image capturing device 1 to allow the light spot to move along the outline or the track of the reference track shown on the display unit 11, and the light track of the still image captured is substantially the same with the outline or the track of the reference track.

Moreover, during the exposure period, although the light spot moves along the outline or the track of the reference track to trace the reference track, no image is captured during the exposure period, since it is not a preview period, and no preview image is captured. Instead, during the exposure period, the light beams of the incident light tracing the reference track projected on the image sensor 15A are collected.

And then, after all the light beams from the incident light tracing the reference track during the exposure period are accumulated, only one image is provided from the light beams by the image sensor 15A, which is the still image with the light track that traces the reference track. That is, the image sensor 15A is continuously receiving the incident light when the incident light is tracing the reference track during the exposure period, and only the one still image with the light track that traces the reference track is captured in this one exposure period.

More specifically, the exposure period for producing the still image with the light track that traces the reference track is different from a plurality of exposure periods for producing a plurality of preview images, since the step of varying the position of the incident light projected on the image sensor 15A is performed after the preview image is captured, of which the exposure period has ended. In other words, a preview status of an image capturing device provides a video streaming having a plurality of continuous preview images, and each the preview image is formed in one exposure period according the current object.

In an embodiment, the reference track displayed or superimposed on the preview image may be semi-transparent, such that the user can see the moving of the light spot moving along the reference track more clearly.

After the reference track has been traced, the shutter 18 is shut down. The shutter 18 may be shut down by pressing again the shutter button or may be shut down by the controller 17 when a predetermined exposure period has elapsed.

Figure 4A:
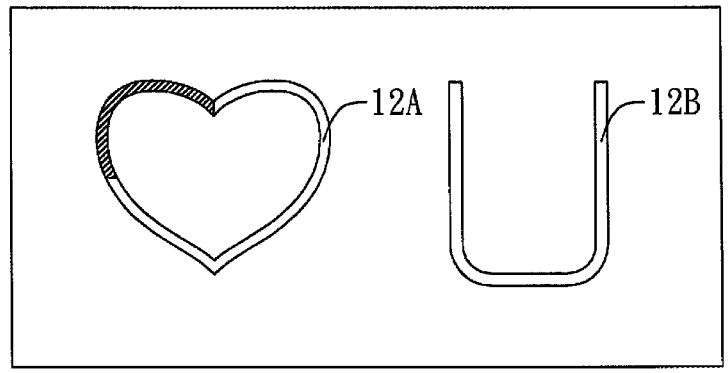
FIGS. 4A-4F show an exemplary sequence of displaying the reference track.
Figure 4B:
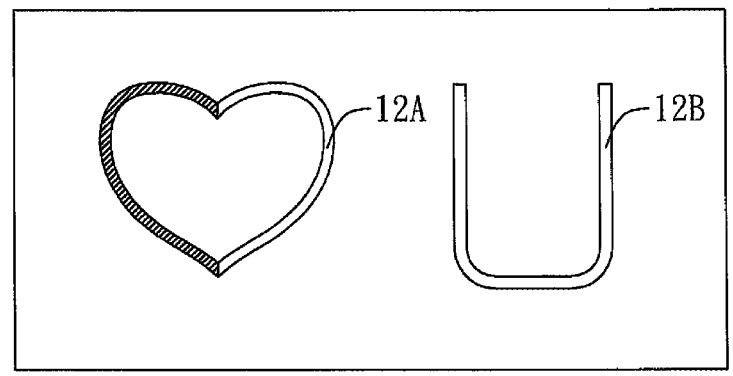
Figure 4C:
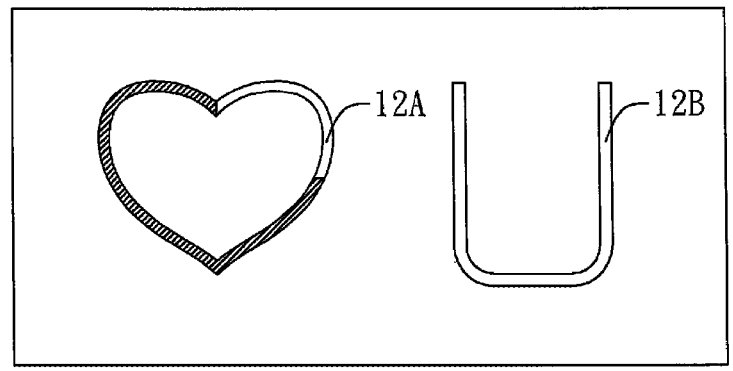
Figure 4D:
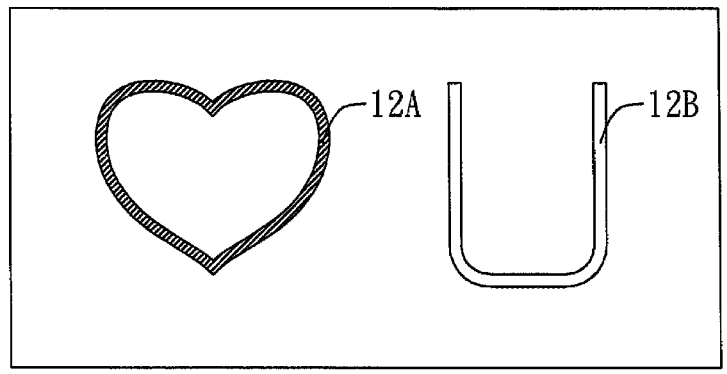
Figure 4E:
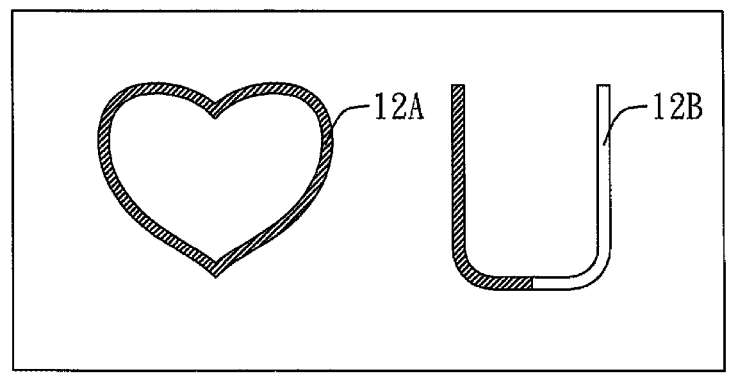
Figure 4F:
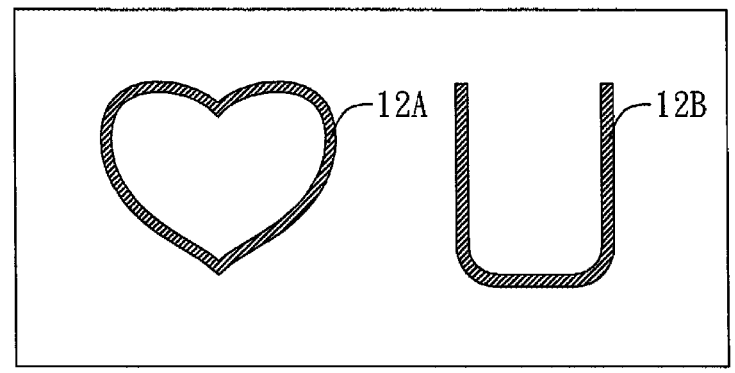

In order to assist the user in tracing the reference track, in the embodiment, the reference track is gradually highlighted according to a chronological order by which the reference track is inputted. FIGS. 4A-4F show an exemplary sequence of displaying the reference track. In this example, referring to FIG. 3A and FIGS. 4A-4F, the first reference track 12A is gradually highlighted as shown in FIG. 4A through FIG. 4D, while the second reference track 12B is less visible. During a transition period between the first reference track 12A and the second reference track 12B as shown in FIG. 4D, the image sensor 15B is blocked from exposure, such that no unwanted light track is produced between the first reference track 12A and the second reference track 12B. After the transition period, the second reference track 12B is gradually highlighted as shown in FIG. 4E through FIG. 4F.

Figure 5A:
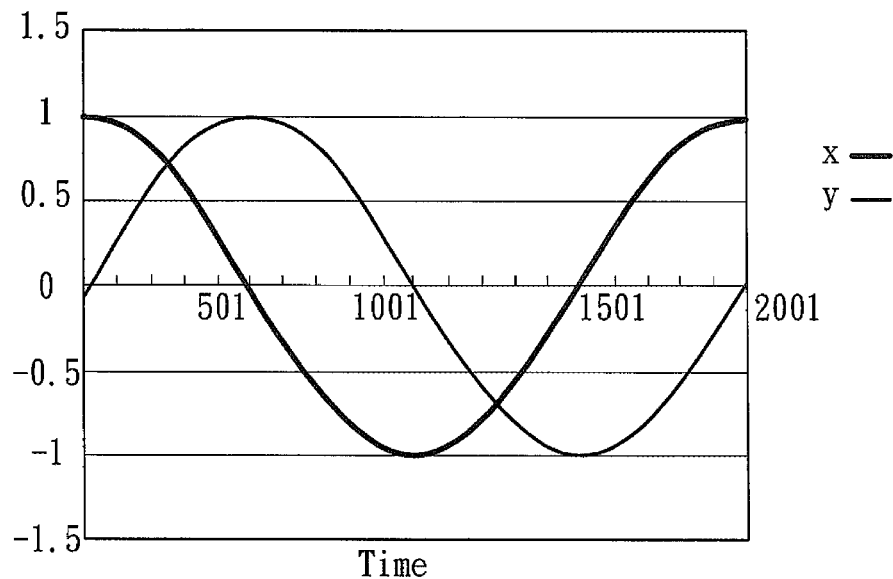
FIG. 5A shows horizontal/vertical (x/y) coordinates of the reference track of FIG. 3B during the exposure period without holding still.
Figure 5B:
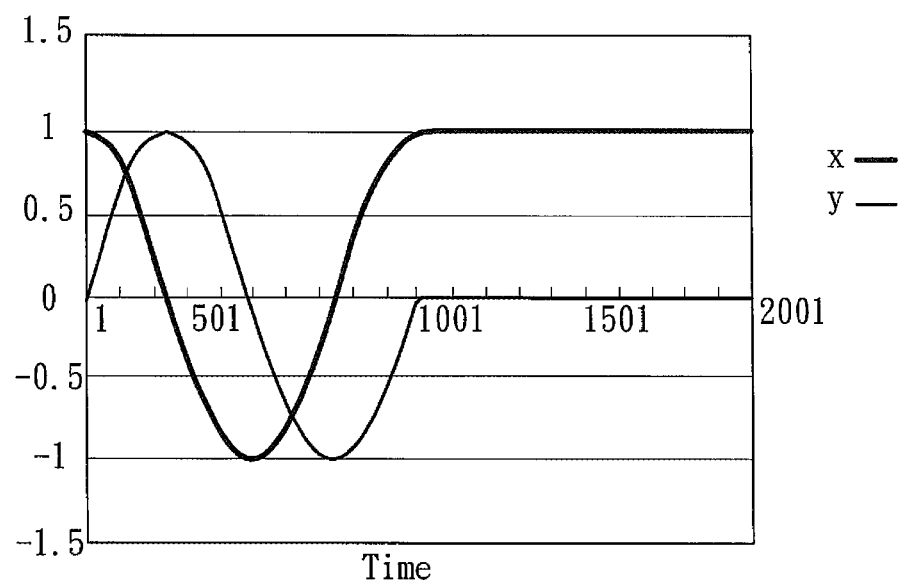
FIG. 5B shows horizontal/vertical (x/y) coordinates of the reference track of FIG. 3B during the exposure period with holding still.

In an embodiment alternative to the first embodiment, during a portion of the exposure period for example the second half of the exposure period, the image capturing device 1 is held still, by such as the controller 17, in order to obtain a more clearly exposed background. In the embodiment, the position of the incident light is held still during a portion of the exposure period by the controller 17; for example, the positions of the lens 16A and the image sensor 15A are held still during a portion of the exposure period, by such as the controller 17. FIG. 5A shows horizontal/vertical (x/y) coordinates of the reference track of FIG. 3B during the exposure period without holding still, and FIG. 5B shows horizontal/vertical (x/y) coordinates of the reference track of FIG. 3B during the exposure period with holding still. The image capturing device 1 operated according to FIG. 5B will obtain a more clearly exposed background than FIG. 5A.

Referring to FIG. 2, in step 105, the brightness values of the still image may be optionally adjusted. In the embodiment, the adjusting ratios for the brightness values are built in the computing center 14 of the image capturing device 1. The adjusting ratios may be fine adjusted by the user after the still image is captured. The brightness values of the still image may be adjusted according to a length of the exposure period to prevent the still image from being over-exposed. Generally speaking, the longer is the exposure period, the brightness values are decreased with greater amount.

Figure 6:
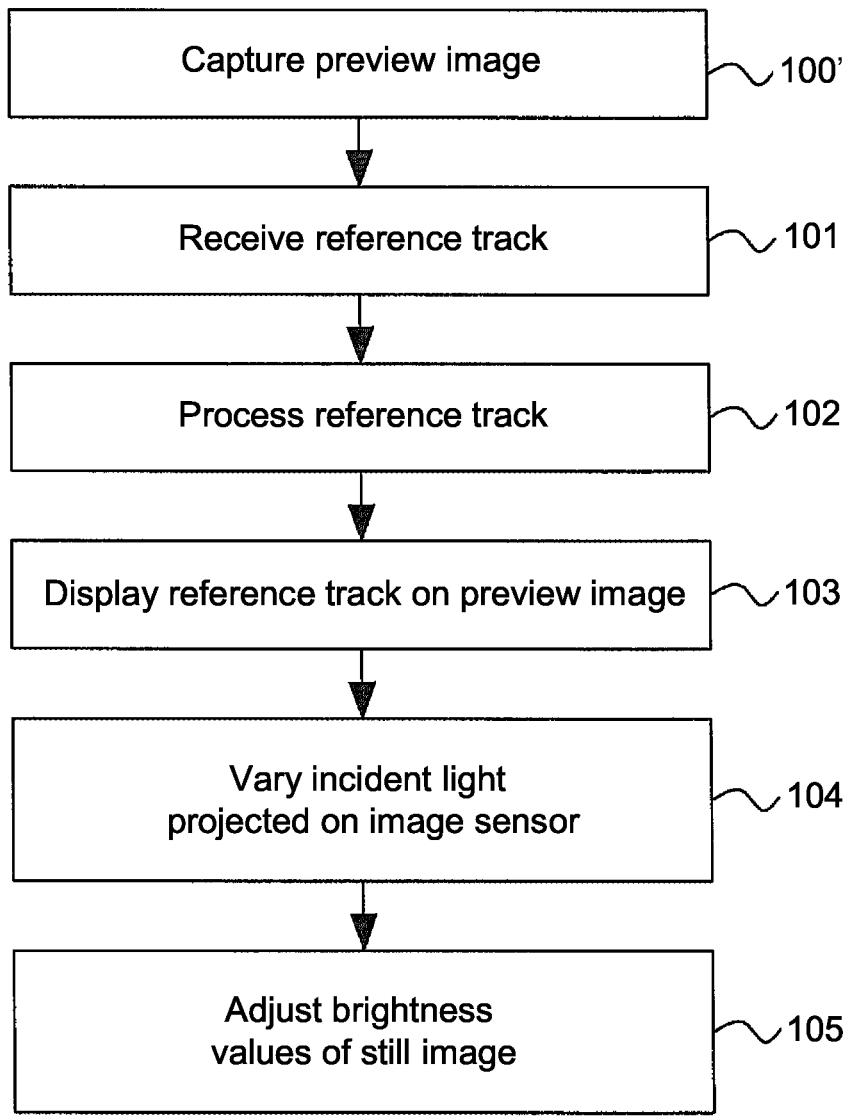
FIG. 6 shows a flow diagram illustrating a method of producing a still image according to a second embodiment of the present invention.

FIG. 6 shows a flow diagram illustrating a method of producing a still image according to a second embodiment of the present invention. The image capturing device 1 as shown in FIG. 1 may be still adaptable to the flow diagram of FIG. 6. The flow shown in FIG. 6 is similar to the flow shown in FIG. 2, with the distinction that the preview image is captured in a step 100' before the reference track is received in step 101. However, in the first embodiment as shown in FIG. 2, the preview image is captured in step 100 after the reference track is received in step 101. The steps 101-105 of the present embodiment are the same as the first embodiment, and are thus omitted for brevity.

Figure 7A:
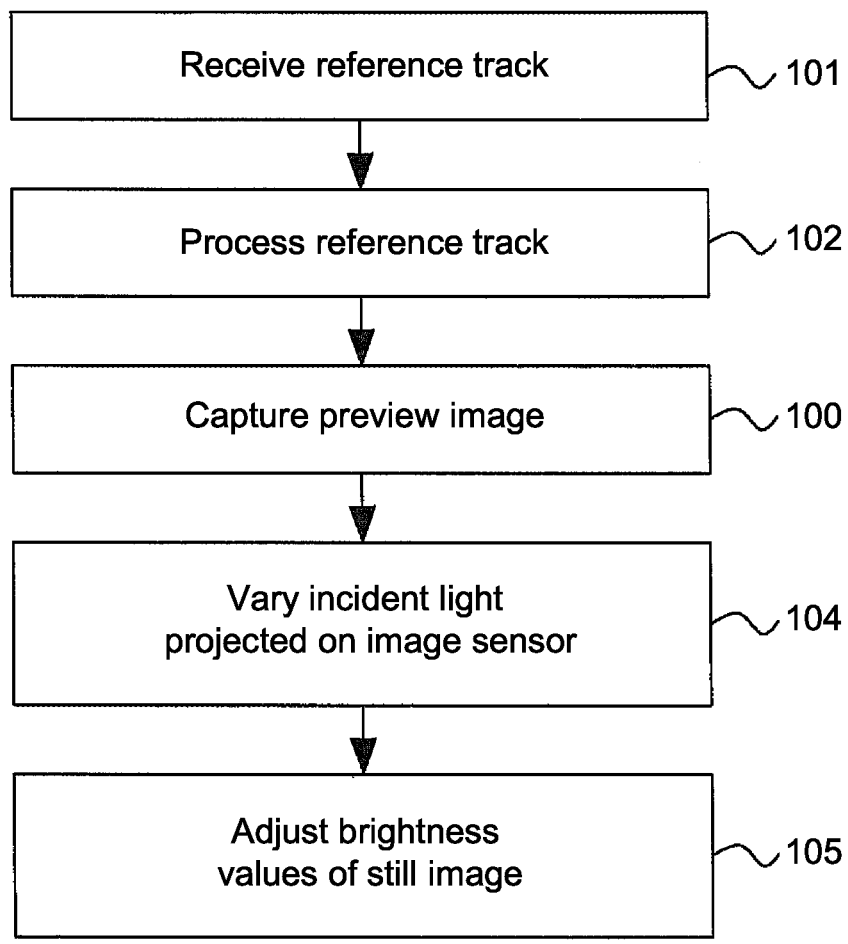
FIG. 7A shows a flow diagram illustrating a method of producing a still image according to a third embodiment of the present invention.
Figure 7B:
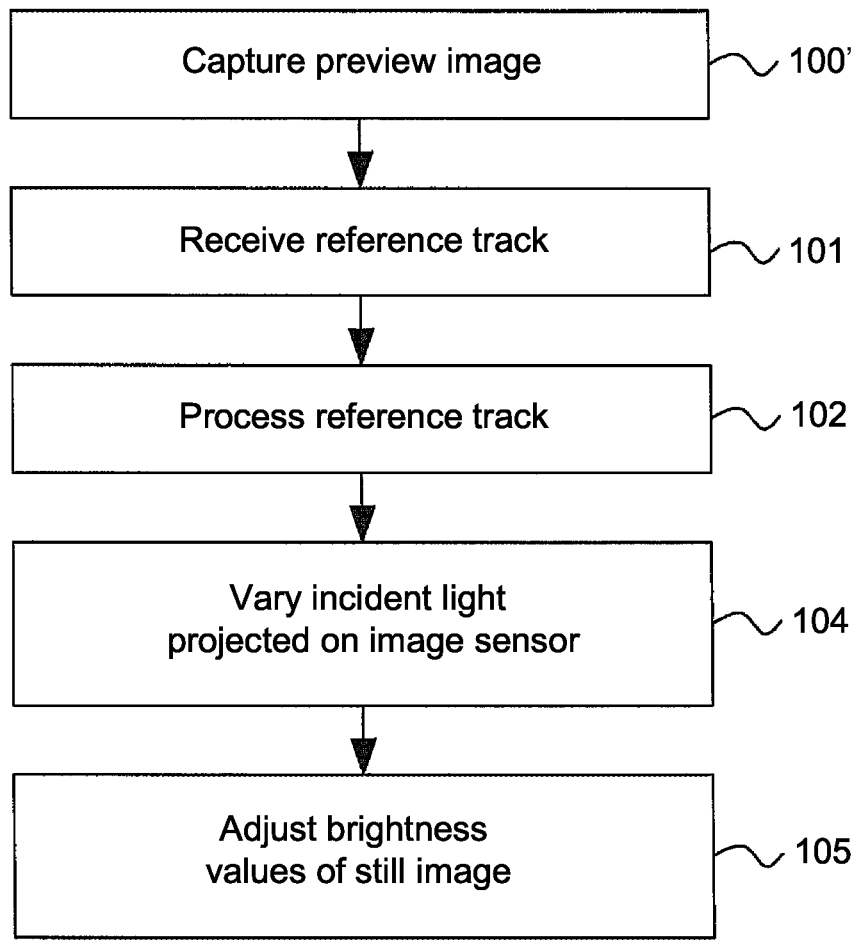
FIG. 7B shows a flow diagram according to an alternative third embodiment of the present invention.

FIG. 7A shows a flow diagram illustrating a method of producing a still image according to a third embodiment of the present invention. The image capturing device 1 shown in FIG. 1 may be still adapted to the flow diagram of FIG. 7A. The flow shown in FIG. 7A is similar to the flow shown in FIG. 2, with the distinction that the step 103 is not necessary in the present embodiment. The steps 101-102 and 105 of the present embodiment are the same as the first embodiment, and are thus omitted for brevity. FIG. 7B shows a flow diagram according to an alternative third embodiment of the present invention. The flow shown in FIG. 7B is similar to the flow shown in FIG. 6, with the distinction that the step 103 is not necessary in the present embodiment.

Figure 8A:
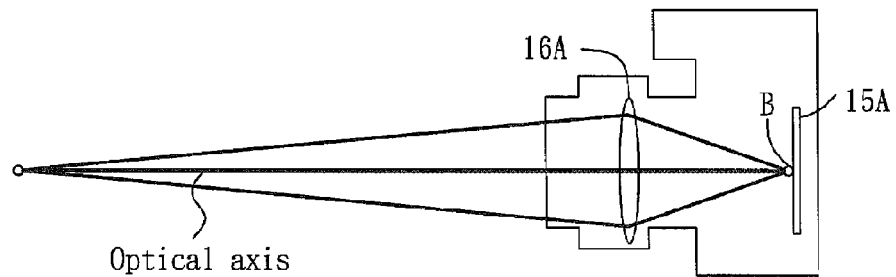
FIG. 8A shows a schematic diagram illustrating a lens and an image sensor.
Figure 8B:
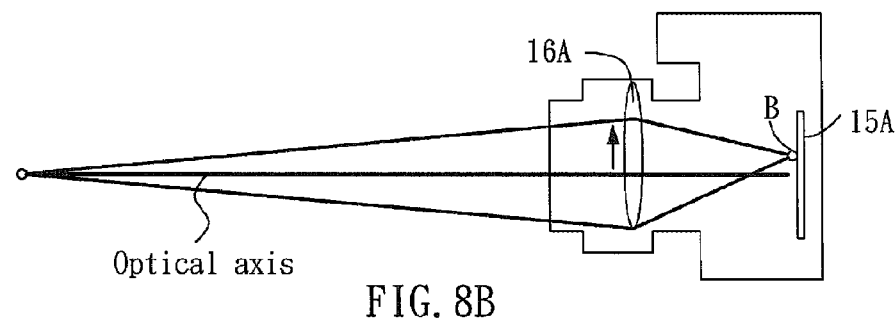
FIG. 8B shows a schematic diagram in that the lens is driven upward relative to the image sensor.

Referring to FIG. 7A/B and FIG. 1, in step 104, the position of the incident light projected on the image sensor 15A may be varied by the sensor driver 15B to drive the image sensor 15A and the lens driver 16B to drive the lens 16A that is under control of the controller 17 for the image sensor 15A and the lens 16A are relative motion. That is, in the image capturing device 1, the lens 16A is moved by the lens driver 16B or the image sensor 15A is moved by the sensor driver 15B, in order for the lens 16A and the image sensor 15A to move relatively, for the incident light projected on the image sensor 15A according to the reference track during the exposure period. FIG. 8A shows a schematic diagram illustrating the lens 16A and the image sensor 15A. FIG. 8B shows a schematic diagram in that the lens 16A is driven upward relative to the image sensor 15A, such that the position of the incident light projected on the image sensor 15A is also driven upward. According to this embodiment, a light track that traces the reference track is produced on the still image, which is captured by the image sensor 15A.

Figure 8C:
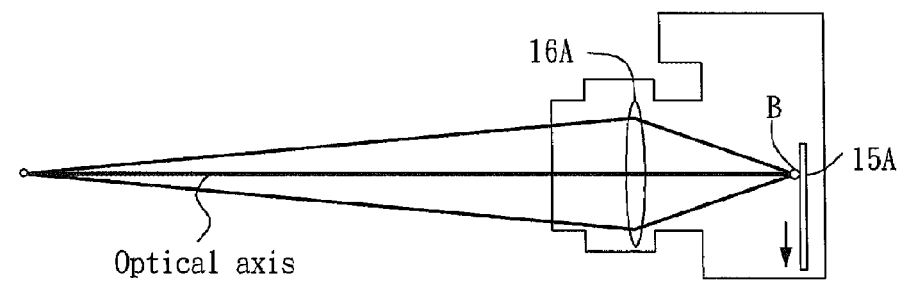
FIG. 8C shows a schematic diagram in that the image sensor is driven downward relative to the lens.

Referring to FIG. 7A/B and FIG. 1, in step 104 of an embodiment alternative to the third embodiment, the position of the incident light projected on the image sensor 15A is varied by moving the image sensor 15A, by such as the image driver, relative to the lens 16A by the sensor driver 15B that is under control of the controller 17. For example, FIG. 8C shows a schematic diagram in that the image sensor 15A is driven downward relative to the lens 16A, such that the position of an incident light projected on the image sensor 15A is driven upward.

Similar to the embodiment as shown in FIG. 2, in the embodiments as shown in FIGS. 7A and 7B, the position of the incident light may move along the outline or the track of the reference track during the exposure period, and the light beams of the incident light tracing the reference track in the exposure period are accumulated to produce the still image with the light track that traces the reference track, that is, the light track of the still image captured is substantially the same with the outline or the track of the reference track.

Referring to FIG. 7A/B and FIG. 1, in step 104 of a further embodiment alternative to the third embodiment, during the exposure period, the shutter 18 is shut down during a transition period in the exposure period between the adjacent reference tracks such as that between the first reference track 12A and the second reference track 12B exemplified in FIG. 3A. As a result, no unwanted light track is produced between the first reference track 12A and the second reference track 12B.

In an embodiment, the above-mentioned method of producing a still image may be performed by a storage medium for storing data for accessing by an application program being executed on a data processing device.

Although specific embodiments have been illustrated and described, it will be appreciated by those skilled in the art that various modifications may be made without departing from the scope of the present invention, which is intended to be limited solely by the appended claims.

What is claimed is:

1. A method of producing a still image, comprising:
   receiving a reference track;
   displaying the reference track on a preview image captured, and the preview image has a light spot; and
   varying a position of an incident light projected on an image sensor to trace the reference track during an exposure period to capture the still image,
   wherein the light spot moves to follow a path of an outline, or a track of the reference track in the exposure period.

2. The method of claim 1, after receiving the reference track, further comprising:
   subjecting the reference track to signal processing, low pass filtering, or band pass filtering.

3. The method of claim 1, wherein the light spot of the preview image includes at least one pixel having a brightness value greater than brightness values of pixels of non-light spot portion of the preview image.

4. The method of claim 1, wherein the step of varying the position of the incident light comprises:
   moving a lens or the image sensor of the image capturing device relatively for the incident light projected on the image sensor according to the reference track during an exposure period.

5. The method of claim 4, wherein positions of the lens and the image sensor are held during a portion of the exposure period.

6. The method of claim 1, further comprising:
   adjusting brightness values of pixels of the still image according to a length of the exposure period.

7. A non-transitory storage medium for storing data for accessing by an application program being executed on a data processing device to perform a method of producing a still image, the method comprising:

receiving a reference track;

displaying the reference track on a preview image captured, and the preview image has a light spot; and varying a position of an incident light projected on an image sensor to trace the reference track during an exposure period to capture the still image, wherein the light spot moves to follow a path of an outline, or a track of the reference track in the exposure period.

8. The non-transitory storage medium of claim 7, wherein after receiving the reference track, the method further comprises:

subjecting the reference track to signal processing, low pass filtering, or band pass filtering.

9. The non-transitory storage medium of claim 7, wherein the light spot of the preview image includes at least one pixel having a brightness value greater than brightness values of pixels of non-light spot portion of the preview image.

10. The non-transitory storage medium of claim 7, wherein the step of varying the position of the incident light comprises:

moving a lens or the image sensor of the image capturing device relatively for the incident light projected on the image sensor according to the reference track during an exposure period.

11. The non-transitory storage medium of claim 10, wherein positions of the lens and the image sensor are held during a portion of the exposure period.

12. The non-transitory storage medium of claim 7, wherein the method further comprises:

adjusting brightness values of pixels of the still image according to a length of the exposure period.

13. A device for producing a still image, comprising:

a receiver, receiving a reference track;

a display unit, displaying the reference track on a preview image captured, and the preview image having a light spot; and a mechanism, varying a position of an incident light projected on an image sensor to trace the reference track during an exposure period to capture the still image, wherein the light spot moves to follow a path of an outline, or a track of the reference track in the exposure period.

14. The device of claim 13, further comprising:

a computer center for subjecting the reference track to signal processing, low pass filtering, or band pass filtering.

15. The device of claim 13, further comprising:

a lens driver for moving a lens or a sensor driving for moving the image sensor of the image capturing device relatively for the incident light projected on the image sensor according to the reference track during an exposure period.

16. The device of claim 13, further comprising:

a controller for holding the positions of the lens and the image sensor still during a portion of the exposure period.

17. The device of claim 13, wherein the device is movable according to the reference track during the exposure period when the position of the incident light varies.

18. The device of claim 13, further comprising:

a controller for holding the position of the incident light still during a portion of the exposure period.

19. The device of claim 13, wherein the receiver receives a plurality of the reference tracks, the device further comprising:

a shutter, being shutting down during a transition period in the exposure period between the adjacent reference tracks.

20. The device of claim 13, further comprising:

an adjuster for adjusting brightness values of pixels of the still image according to a length of the exposure period.

* * * * *